March 16, 1954 J. B. DES ROSIERS 2,672,261
MEASURING SPOUT
Filed June 19, 1951 3 Sheets-Sheet 1

INVENTOR.
John B. DesRosiers
BY
ATTORNEY

March 16, 1954     J. B. DES ROSIERS     2,672,261
MEASURING SPOUT

Filed June 19, 1951     3 Sheets-Sheet 2

*INVENTOR.*
John B. DesRosiers
BY
*Max Schwartz*
ATTORNEY

March 16, 1954  J. B. DES ROSIERS  2,672,261
MEASURING SPOUT

Filed June 19, 1951  3 Sheets-Sheet 3

INVENTOR.
John B. DesRosiers
BY
Max Schwartz
ATTORNEY

Patented Mar. 16, 1954

2,672,261

UNITED STATES PATENT OFFICE 2,672,261

MEASURING SPOUT

John B. Des Rosiers, Providence, R. I.

Application June 19, 1951, Serial No. 232,387

1 Claim. (Cl. 222—364)

My present invention relates to pouring spouts, and more particularly to a combination pouring and measuring spout.

The principal object of the present invention is to provide a combination pouring and measuring spout for dry, powdered articles.

Another object of the present invention is to provide a combination pouring and measuring spout which is simple in construction and easy and economical to assemble with the container.

A further object of the present invention is to provide a combination pouring and measuring spout which can either be made a part of the container or can be incorporated in a separate unit.

Another object of the present invention is to provide a spout for a container for dry, powdered articles which can be used for continuous pouring or for pouring measured quantities.

With the above and other objects and advantageous features in view, my invention consists of a novel arrangement of parts, more fully disclosed in the detailed description following, in conjunction with the accompanying drawings, and more particularly defined in the appended claim.

In the drawings—

In dispensing dry, powdered articles, such as salt or flour, it has become customary to provide the package with a metallic pouring spout. This spout can normally be retained in closed position and forms a seal over the opening. The spout is designed to be swung into an open pouring position which permits the contents of the package to be poured in an even stream. These spouts can readily be attached to any type of cardboard container where quantities of the dry, powdered material are frequently used. They can be attached to packages of bicarbonate of soda, cracker meal, dry skim milk powder, cereals, soap powders, etc., or any other similar articles, in addition to salt or flour. However, since most of these substances require specific measured quantities in use, a great deal of waste occurs when the substances are just poured from a wide open spout into a small measuring cup or spoon.

The present invention, is therefore, designed to provide a spout which will not only permit pouring the contents, but will measure the quantities poured. The spout can be made to accommodate either a teaspoonful, a tablespoonful, or fractions thereof, or any other desired quantities depending on the contents of the package. The spout of the present invention can also be adjusted to provide continuous pouring, if desired. Also, the spout of the present invention can be built into the package or can be made part of an auxiliary member designed to be placed on the package by the householder.

Figure 1:
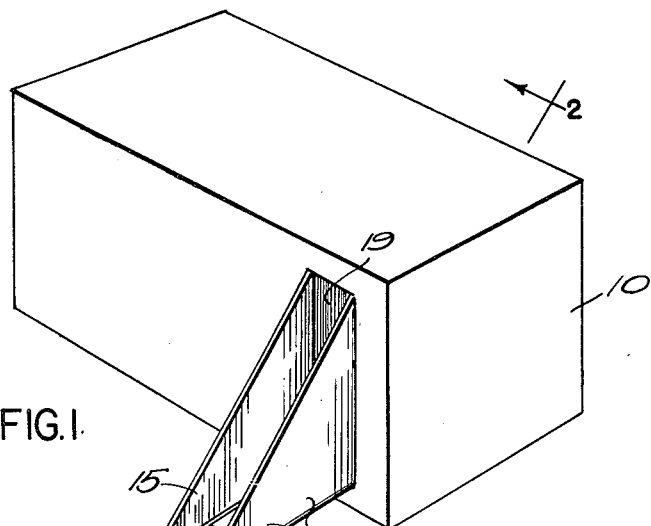
Fig. 1 is a perspective view of a container with a spout of the present invention in open position.

Referring more in detail to the drawings, Fig. 1 shows a container 10 of general rectangular shape, having adjacent the bottom end thereof a spout 12 in open position. The container is shown lying on its side to provide a better view of the spout. The spout 12 is generally triangular in shape and comprises a narrow substantially rectangular wall portion 13 having an extended tip 14. Extending integrally from the side edges of the portion 13 are spaced parallel triangular side walls 15 and 16. Each side wall 15 and 16 is provided with an integral rectangular wall portion 17 and 18 bent at right angles from each side wall inwardly so that the bent portions 17 and 18 will overlap each other to form an inside elongated wall portion 19.

Referring to Fig. 1, the above described spout forms a triangular container and it is made of a size to hold the desired measured quantity for the particular container. For example, if placed on a package of salt, the most popular size would be a teaspoonful. For a package of flour, the most popular size would be some fraction of a cup.

Figure 2:
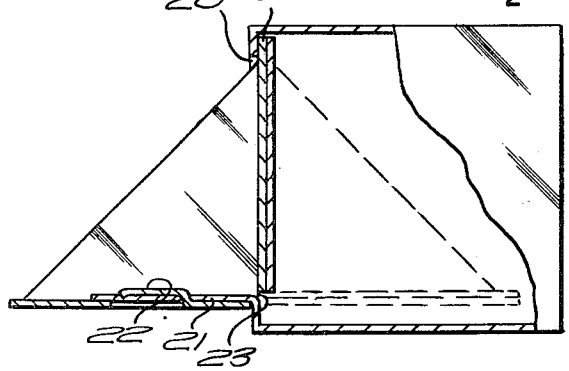
Fig. 2 is a section taken on line 2—2 on Fig. 1.

The package 10 is provided with a cut out slot 20, see Fig. 2. In cutting out the slot 20, some of the material adjacent one small side of the slot, as at 21, is allowed to remain hingedly attached to the wall of the container. The spout is attached to the portion 21 by providing the wall 13 with a struck up tang 22 extending outwardly parallel to the wall 13. The portion of the container 21 is slipped into a space or slot 23 at the inner corner of the spout, as shown in Fig. 2, extending along the inner face of the wall portion 13 and hooking into the tang 22. In this position, the spout will pivot inwardly and outwardly through the slot 20, the wall portion 21 acting as a hinge.

The side walls 15 and 16 are slightly wider spaced than the width of the slot 20, so that when the spout is pivoted into open or closed position, the side walls 15 and 16 will resiliently squeeze against the edges of the slot to frictionally engage the same and prevent leakage around the spout. The overlapping end walls 17 and 18 permit this spring action so that the spout will slide easily without tearing out the sides of the slot. In closed position, shown in dotted lines in Fig. 2, the tip 14 on the front wall 13 will overlap the free edge of the slot 20 to assist in sealing the opening and to provide a finger hold for moving the spout. The wall 19 also has an extended portion 24 to abut the inner face of the container beyond the slot and prevent the spout from swinging completely outwardly.

Figure 3:
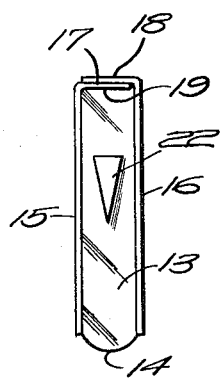
Fig. 3 is a plan view of the same, showing the method of attachment to the container.

With the parts assembled as described and shown in Figs. 1-3 inclusive, the spout is manually grasped by the tip 14 and swung outwardly into the position shown in Fig. 1. This will bring out of the container the desired measured quantity of the contents. The spout can then be moved inwardly into the dotted line position shown in Fig. 2, sealing the container. By turning the container into upright position, the spout portion will again be filled ready to deliver another measured quantity of the contents. If it is desired to pour the contents indiscriminately, the spout need only be half opened so that part of the spout is still within the container and part of the spout is outside of the container. This will provide a free flowing opening through the spout.

Figure 4:
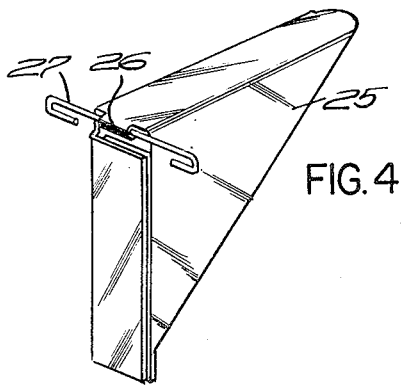
Fig. 4 is a perspective view of a spout with an alternative form of attachment to the container.

If desired, the spout can be provided with the type of hinge shown in Fig. 4. Instead of providing the container slot with the hinge portion 21, the container slot is completely cut out. The spout 25 is then provided at its pivotal corner with an integral loop portion 26 which forms a pivot hinge. A wire staple 27 can then be passed through the hinge and its ends pierced through the side of the container and reentrantly bent to lock the staple to the container. The spout 25 will then pivot on the staple 27. It should be noted that the spring pressure provided by the sides 15 and 16 serve to lock the spouts in either closed or open position.

Figure 5:
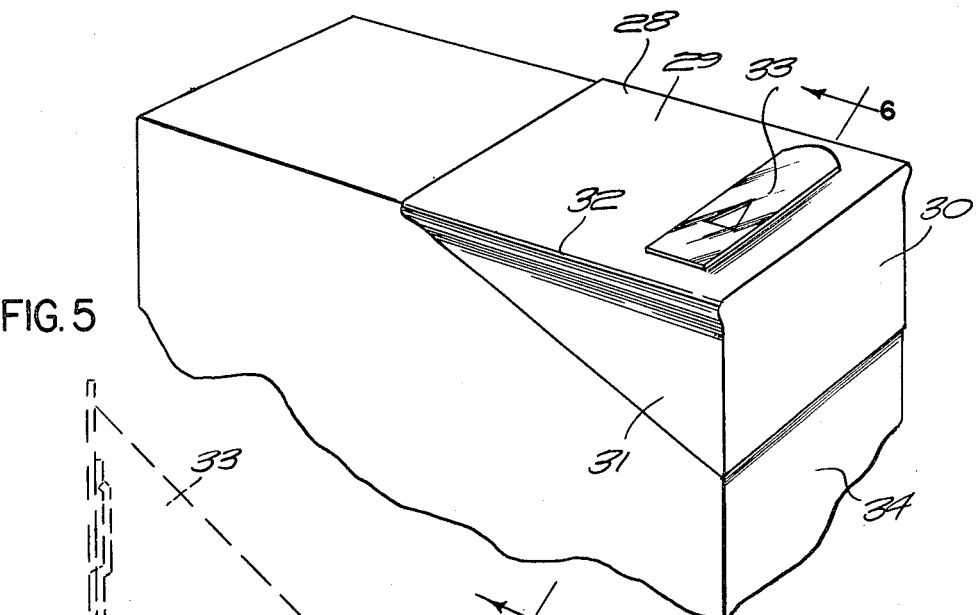
Fig. 5 is a perspective view of an auxiliary container top equipped with a spout of the present invention.
Figure 6:
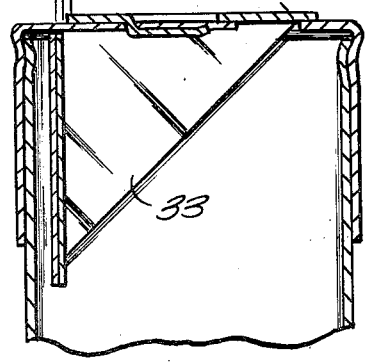
Fig. 6 is a section taken on line 6—6 on Fig. 5.

At present, most containers do not have built in spouts. Salt packages and one or two others have spouts. The present invention can, therefore, be built into an auxiliary cover member which can readily be attached to a standard size package. For example, as shown in Figs. 5 and 6, the auxiliary cover 28 may be made of cardboard, metal or even plastic material for a more permanent construction. It comprises a triangular shaped member having a top portion 29 which is slightly wider than the top width of the standard package or container and approximately half its length. It is provided with an end wall 30 adapted to extend a short distance along the side wall of the container as shown in Fig. 5, and integral triangular shaped side walls 31 connecting the end wall 30 with the outer free tip of the top wall 29. At the junction of the side walls 31 and the top 29, the auxiliary container 28 is flared outwardly as at 32. The top portion 29 is also provided with a measuring spout 33 of the type herein described.

The standard cardboard package or container 34 is usually provided with a multiple thickness of material on the top where it is sealed in packing. This multiple thickness of material forms a stiff top cover portion which is much stiffer than the sides of the package. One end of the top cover portion is cut or torn off. The spout 33 is swung into the dotted line open position as shown in Fig. 6 for clearance. The auxiliary cover portion 28 is then slipped over the end of the container into the position shown in Fig. 1. The hard cover portion of the top of the container will extend into the flared out portions 32 of the auxiliary portion and the triangular side portions 31 will squeeze the sides of the container slightly inwardly as shown in Fig. 6. This will lock the auxiliary portion 28 to the container and allow the spout 33 to be pushed inwardly and used in the manner hereinabove described. After the package has been emptied, the spout 33 can again be opened for clearance and the auxiliary portion 28 slipped off the container and reused on a fresh container. The auxiliary member 28 can be made of any desired size to fit different standard sized packages. If it is desired to use the measuring spout on a jar, the auxiliary portion 28 can be built in an annular construction adapted to screw on to the top of standard Mason jars, cans or bags.

Figure 7:
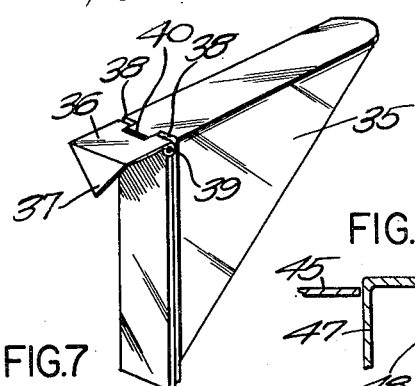
Fig. 7 is a perspective view of a spout with another form of attachment.
Figure 8:
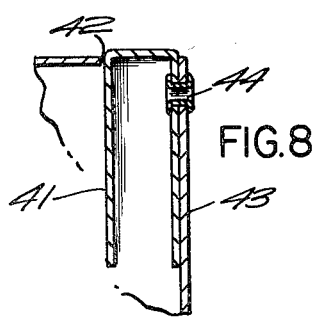
Fig. 8 is a sectional view of a spout with still another form of attaching means to the container.

In Figs. 7 and 8, I have shown two more methods of hingedly mounting the spout to the container. In the form shown in Fig. 7, the spout 35 is provided with an auxiliary hinge member 36 having an integral downwardly extending tang 37 at one end and spaced rounded portions 38 at the other end forming bearings for a pivot pin 39. The spout 35 is provided with an integral rearwardly extending portion 40 which surrounds the middle portion of the pivot pin 39. When the spout is placed in position in its slot, the tang 37 can be driven into the container and reentrantly bent over to lock the auxiliary portion 36 to the body of the container. The spout 35 will then swing about the pivot pin 39.

In the form shown in Fig. 8, the spout 41 is positioned in a slot 42 which must be cut immediately adjacent one wall 43 of the container. This may be the top or the bottom wall. In this position, when the spout 41 is inserted into the slot, one side wall of the spout will abut the container wall 43. A rivet or eyelet 44 is then driven through the container wall 43 and through the adjacent abutting side wall of the spout 41 at a point close to the inside corner of the spout. With this construction, the rivet 44 will act as a pivot member and permit the spout to swing about the rivet 44 into open or closed position.

Figure 9:
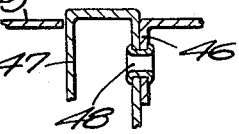
Fig. 9 is a sectional view of a spout with another form of attachment to the container.
Figure 10:
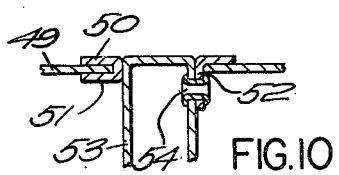
Fig. 10 is an alternative form of the construction shown in Fig. 9.

As an alternative to the construction shown in Fig. 8, the constructions shown in Figs. 9 and 10 may be used.

In the form shown in Fig. 9, the slot is cut in the wall 45 of the package, with only three sides of the slot material being actually cut. This permits the package wall material in the slot to be bent inwardly as at 46, so that it depends into the package. The spout 47 is then positioned in the slot and the rivet 48 passed through the depending portion 46 and one side wall of the spout adjacent the pivotal corner, as in the form shown in Fig. 8. The spout will then swing in and out of the slot, pivoting about the rivet 48.

For a more definite and more lasting construction than that shown in Fig. 9, the form shown in Fig. 10 may be used. In this form, the package wall 49 is completely cut out to form the slot. A metal or plastic frame 50, having depending flange portions, may be inserted into the slot. The flange portions may be turned under as at 51 on three sides to clamp the package wall 49 around the slot. On the third side, the depending wall 52 is allowed to extend into the package to form the support for the spout 53. The pivot rivet 54 extends through the wall portion 52 and through one side wall of the spout 53 to permit the spout to be swung in and out of the slot. This construction insures a tight fit between the side walls of the spout and the edges of the slot and prevents such tight fit from wearing away as the spout is used.

When an auxiliary spout portion such as shown in Fig. 5 is used, it is necessary to have a different size auxiliary portion for each different size container. However, where this is not practical, the adjustable type of construction shown in Figs. 11 and 12 may be used.

In this form, the auxiliary portion comprises two telescoping members 55 and 56. The member 55 comprises a generally rectangular flat portion 57 having an inturned edge 58 and an integrally depending end portion 59. The outside edges of the portions 57 and 59 are joined by a triangular side portion 60. At the edge of the member 55, where it is integrally joined to the depending portion 59, the material is reentrantly bent as at 61 to form an extending channel portion. The lower edge of the depending portion 59 is also reentrantly bent as at 62. The member 57 is provided with a measuring spout 63 attached thereto in any of the forms hereinabove described. The depending portion 59 is also provided with a horizontal slot 64 extending inwardly from the free edge thereof, as shown in Fig. 11.

The member 56 is shaped generally identically with the member 55 and is designed to slide within the member 55. For this purpose, the upper rectangular portion 65 thereof is of such length that one end extends within the reentrantly bent portion 58 of the member 55 and the other end extends within the channel formed by the reentrantly bent portion 61 of the member 55. The rectangular portion 65 is also provided with a rectangular cut out 66 to permit telescoping of the members without interfering with the measuring spout. The member 56 is also provided with a depending portion 67 extending integrally from the upper rectangular portion 65, with its lower edge sliding within the reentrantly bent end 62 of the portion 59. The portions 65 and 67 are joined by the triangular side wall 68.

Figure 11:
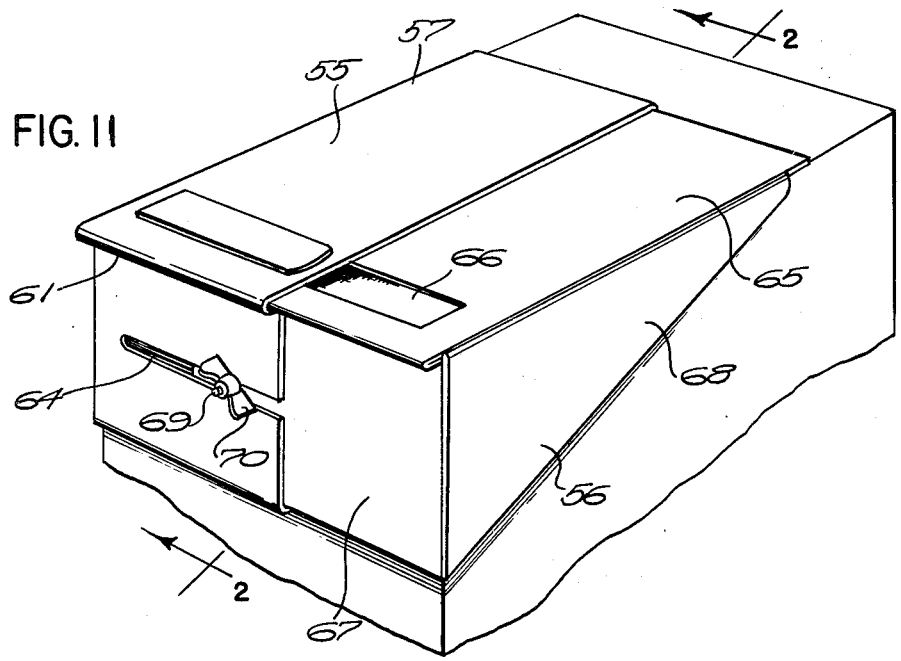
Fig. 11 is a perspective view of an adjustable auxiliary spout.
Figure 12:
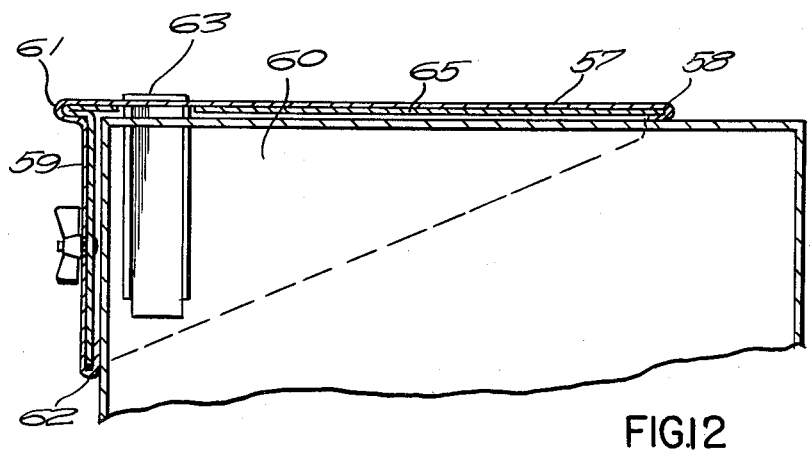
Fig. 12 is a section thereof taken on line 12—12 on Fig. 11.

With this construction, the member 56 will slide within the member 55 to narrow or widen the auxiliary member as shown in Figs. 11 and 12. To lock the members into adjusted position on top of a box, the depending wall 67 is provided with a threaded bolt 69 which extends into the slot 64 and slides along the slot. A wing nut 70 is threaded on this bolt. When the parts have been pushed together so that they are held tightly on a box top, the wing nuts 70 can be tightened to lock them in adjusted position. This will permit the structure to be used on successive boxes of the same size without disturbing the adjustment.

The above constructions, therefore, provide a simple and effective means of permitting measured quantities of a dry product to be taken from the container. For example, soap flakes and powders for dish washing and clothes washing machines are usually measured in tablespoonfuls. A great deal of waste occurs when the soap box is just tilted over the washing machine and the soap indiscriminately poured in, or when an attempt is made to pour the soap powder into a tablespoon. By the use of the present invention, the spout can be provided to deliver a tablespoonful of soap flakes each time that the spout is opened. The cost of manufacturing and attaching the spout of the present invention is so small that it can readily be placed on a container to be discarded when the contents are emptied.

While I have described certain specific embodiments of my invention, it is obvious that changes may readily be made in the size and shape of the parts, and in the method of attachment, without departing from the spirit and scope of the invention as defined in the appended claim.

I claim:

A combination pouring and measuring spout for a container, comprising rectangular wall portions at right angles to each other in end to end relation, spaced triangular side walls joining the edges of said wall portions, said spout having a predetermined capacity, and means for mounting said spout for pivotal movement into and out of a container opening, said means comprising an auxiliary member adjustably attachable to the container, said auxiliary member comprising two telescoping portions adapted to adjustably fit over the top of the container, and means for locking said portions in adjustable position.

JOHN B. DES ROSIERS.

References Cited in the file of this patent
UNITED STATES PATENTS

| Number | Name | Date |
|---|---|---|
| 1,606,194 | Strafford | Nov. 9, 1926 |
| 1,781,968 | Bastiaens | Nov. 18, 1930 |
| 2,318,899 | Stilwell | May 11, 1943 |
| 2,589,835 | Malachick | Mar. 18, 1950 |